(12) United States Patent
Yang et al.

(10) Patent No.: US 8,594,180 B2
(45) Date of Patent: Nov. 26, 2013

(54) 3D VIDEO ENCODING

(75) Inventors: Kai Chieh Yang, San Diego, CA (US); Haohong Wang, San Jose, CA (US); Khaled Helmi El-Maleh, San Diego, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1839 days.

(21) Appl. No.: 11/677,335

(22) Filed: Feb. 21, 2007

(65) Prior Publication Data

US 2008/0198920 A1    Aug. 21, 2008

(51) Int. Cl.
*G06F 21/00* (2013.01)

(52) U.S. Cl.
USPC ............. 375/240.01; 375/240.02; 375/240.26

(58) Field of Classification Search
USPC .............. 375/240.01, 240.03, 240.12; 348/43
See application file for complete search history.

(56) References Cited

U.S. PATENT DOCUMENTS

| | | | | |
|---|---|---|---|---|
| 6,151,362 | A * | 11/2000 | Wang | 375/240.12 |
| 7,881,370 | B2 * | 2/2011 | Reichel et al. | 375/240.03 |
| 2002/0030675 | A1 | 3/2002 | Kawai | |
| 2002/0181583 | A1 * | 12/2002 | Corbera | 375/240.03 |

FOREIGN PATENT DOCUMENTS

| | | |
|---|---|---|
| EP | 0998151 | 5/2000 |
| EP | 1250012 | 10/2002 |
| JP | 05111057 | 4/1993 |
| JP | 6261860 A | 9/1994 |
| JP | 11341520 A | 12/1999 |
| JP | 2002095018 A | 3/2002 |
| JP | 2002335527 A | 11/2002 |
| WO | 2006094035 | 9/2006 |

OTHER PUBLICATIONS

Naito, Sei and Matsumoto, Shuichi "Advanced Rate Control Technologies for 3D-HDTV Digital Coding Based on MPEG-2 Multi-View Profile"1999, IEEE; IEEE vol. 1, 24, Oct. 1999, pp. 281-285.*
He, Zhihai and Mitra, Sanjit "A Linear Source Model and a Unified Rate Control Algorith for DCT Video Coding" 2002, IEEE; vol. 12, No. 11, Nov. 2002, p. 970-982.*
He Zhihai and Mitra, Sanjit "Optimum Bit Allocation and Accurate Rate Control for Video Coding via p-Domain Source Modeling" 2002, IEEE, vol. 12, No. 10, Oct. 2002, p. 840-849.*

(Continued)

*Primary Examiner* — Morshed Mehedi
*Assistant Examiner* — Jason Lee
(74) *Attorney, Agent, or Firm* — Timothy F. Loomis; Brent Boyd

(57) ABSTRACT

A stereo 3D video frame includes left and right components that are combined to produce a stereo image. For a given amount of distortion, the left and right components may have different impacts on perceptual visual quality of the stereo image due to asymmetry in the distortion response of the human eye. A 3D video encoder adjusts an allocation of coding bits between left and right components of the 3D video based on a frame-level bit budget and a weighting between the left and right components. The video encoder may generate the bit allocation in the rho ($\rho$) domain. The weighted bit allocation may be derived based on a quality metric that indicates overall quality produced by the left and right components. The weighted bit allocation compensates for the asymmetric distortion response to reduce overall perceptual distortion in the stereo image and thereby enhance or maintain visual quality.

27 Claims, 8 Drawing Sheets

(56) References Cited

OTHER PUBLICATIONS

He et al.: "A Linear Source Model and a Unified Rate Control Algorithm for DCT Video Coding", IEEE Transactions on Circuits and Systems for Video Technology, IEEE Service Center, Piscataway, NJ, US, vol. 12 No. 11, Nov. 2002, p. 970-982.
International Search Report—PCT/US08/054447—International Search Authority, European Patent Office—Aug. 6, 2008.
Written Opinion—PCT/US08/054447—International Search Authority, European Patent Office—Aug. 6, 2008.
Zhihai He, et al., "A Linear Source Model and a Unified Rate Control Algorithm for DCT Video Coding," IEEE Transactions on Circuits and Systems for Video Technology, IEEE Service Center, Piscataway, NJ, vol. 12, No. 11, Nov. 1, 2002.
Naito S., et al., "Advanced rate control technologies for 3D-HDTV digital coding based on MPEG-2 multi-view profile," Image Processing, 1999. ICIP 99. Proceedings 1999 International Conference on Kobe, Japan Oct. 24-28, 1999, Piscataway, NJ, IEEE, vol. 1, Oct. 24, 1999, pp. 281-285.
Taiwan Search Report—TW097106138—TIPO—Dec. 6, 2011.

* cited by examiner

US 8,594,180 B2

3D VIDEO ENCODING

TECHNICAL FIELD

The disclosure relates to digital video encoding and, more particularly, techniques for encoding 3D video content.

BACKGROUND

Digital video capabilities can be incorporated into a wide range of devices, including digital televisions, digital direct broadcast systems, wireless communication devices, personal digital assistants (PDAs), laptop computers, desktop computers, digital music and video players, handheld gaming devices, video game consoles, digital cameras, digital recording devices, cellular or satellite radio telephones, and the like. Digital video devices can provide significant improvements over conventional analog video systems in processing and transmitting video sequences with increased bandwidth efficiency.

Different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video encoding standards support improved transmission efficiency of video sequences by encoding data in a compressed manner. Application of video encoding standards to 3D video is desirable to support 3D viewing by users via a wired or wireless network with a finite bandwidth.

Video content may be recorded in a conventional, two-dimensional (2D) format or in three-dimensional (3D) format. 3D video content can be obtained and presented in different ways. As an example, 3D video content may be obtained by a stereoscopic dual camera and presented by left eye and right eye components. Alternatively, a conventional single camera may be used in conjunction with a depth camera to obtain both a cyclopean view and depth data. As another alternative, a single camera may be used to produce a cyclopean view that is processed to produce both a cyclopean view and depth data. Different 3D video sources may require different types of video output devices, such as a conventional 2D display, a stereoscopic display aided by special glasses, or an autostereoscopic display.

SUMMARY

The disclosure is directed to techniques for 3D video encoding. A stereo 3D video frame includes left and right components that are combined to produce a stereo image. For a given amount of distortion, the left and right components may have different impacts on perceptual visual quality of the stereo image due to asymmetry in the distortion response of the human eye. A 3D video encoder adjusts an allocation of coding bits between left and right components of the 3D video based on a frame-level bit budget and a weighting between the left and right components.

The weighting may be based on sensitivity of a human viewer to distortion in the left and right components. The video encoder may generate the bit allocation in the rho ($\rho$) domain using the weighting. The weighted bit allocation may be derived based on a quality metric that indicates overall quality produced by the contributions of the left and right components. The weighted bit allocation compensates the asymmetric distortion response to reduce overall perceptual distortion in the stereo image and thereby enhance or maintain visual quality.

In one aspect, the disclosure provides a method comprising obtaining a frame budget defining a number of encoding bits available for a 3D video frame, and generating bit allocation values for blocks within left and right components of the 3D video frame based on the frame budget and a weighting between the left and right components.

In another aspect, the disclosure provides a device comprising a video encoder configured to obtain a frame budget defining a number of encoding bits available for a 3D video frame, and generate bit allocation values for blocks within left and right components of the 3D video frame based on the frame budget and a weighting between the left and right components.

The techniques described herein may be implemented in hardware, software, firmware, or any combination thereof. If implemented in software, the techniques may be realized in part by a computer program product comprising a computer readable medium comprising program code causes a computer to perform one or more of the methods described herein.

The details of one or more embodiments are set forth in the accompanying drawings and the description below. Other features, objects, and advantages will be apparent from the description and drawings, and from the claims.

DETAILED DESCRIPTION

The disclosure is directed to techniques for 3D video encoding. A stereo 3D video frame includes left and right components that are combined to produce a stereo image. For a given amount of distortion, the left and right components may have different impacts on perceptual visual quality of the stereo image due to asymmetry in the distortion response of the human eye. A 3D video encoder adjusts the allocation of coding bits between left and right components of the 3D video based on a frame-level bit budget and a weighting between the left and right components. The weighting may be based on sensitivity of a human viewer to distortion in the left and right components. The video encoder may generate the bit allocation in the rho ($\rho$) domain. The weighted bit allocation may be derived based on a quality metric that indicates overall quality produced by the contributions of the left and right components. The weighted bit allocation compensates the asymmetric distortion response to reduce overall perceptual distortion to reduce overall perceptual distortion in the stereo image and thereby enhance or maintain visual quality and thereby enhance or maintain visual quality in the stereo image.

Figure 1:
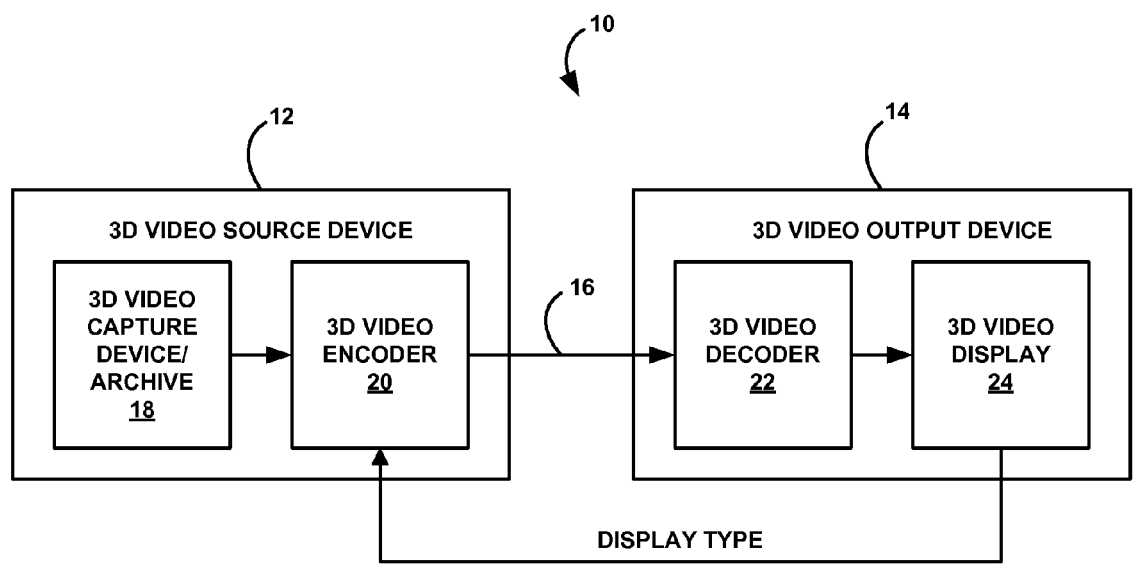
FIG. 1 is a block diagram illustrating a 3D video encoding and decoding system.

FIG. 1 is a block diagram illustrating a 3D video encoding and decoding system 10. As shown in FIG. 1, system 10 includes a 3D video source device 12 and a 3D video output device 14. Devices 12, 14 communicate via transmission channel 16. Transmission channel 16 may be a wired or wireless communication medium. In the example of FIG. 1, 3D video source device 12 includes a 3D video capture device or 3D video archive 18, and a 3D video encoder 20. 3D video output device 14 includes a 3D video decoder 22 and a 3D video display 24. 3D video source device 12 generates video for transmission to 3D video output device 14. In some aspects, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony. Although not shown for ease of illustration, to support wired and/or wireless communication, one or both of devices may include appropriate modem, filter, frequency conversion, and amplification components.

3D video capture device/archive 18 may include any of a variety of 3D video capture devices, such as a stereoscopic dual camera, a single camera combined with a depth camera, or a single camera combined with a 2D-to-3D converter. Alternatively, 3D video capture device/archive 18 may be an archive device that stores previously captured 3D video. As further alternatives, the 3D video may be obtained from a video feed from a content provider, or rendered from computer-generated graphics data. In either case, the captured, pre-captured or rendered 3D video may be encoded by 3D video encoder 20 for transmission from 3D video source device 12 to 3D video output device 14 via transmission channel 16. As yet another example, 3D video source device 12 may comprise a broadcast device that broadcasts one or more channels of 3D video data, as well as channels of 2D video data in some cases.

System 10 may support video telephony or video streaming according to the Session Initiated Protocol (SIP), ITU-T H.323 standard, ITU-T H.324 standard, or other standards. Also, system 10 can support 3D video camcorder applications. 3D video encoder 20 may generate encoded video data according to a video compression standard, such as MPEG-2, MPEG-4, ITU-T H.263, or ITU-T H.264 and its counterpart, ISO/IEC MPEG-4, Part 10, i.e., Advanced Video Coding. Although not shown in FIG. 1, video encoder 20 and video decoder 22 may be integrated with an audio encoder and decoder, respectively, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some aspects, for video broadcasting, this disclosure contemplates application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for delivering services over the FLO Air Interface. Alternatively, video may be broadcasted according to other standards such as DVB-H (digital video broadcast-handheld), ISDB-T (integrated services digital broadcast—terrestrial), or DMB (digital media broadcast). Hence, source device 12 may be a mobile wireless terminal, a video streaming server, or a video broadcast server. However, the techniques described in this disclosure are not limited to any particular type of broadcast, multicast, or point-to-point system. If used in a broadcast system, one or more of the channels may be 3D channels and other channels may be 2D channels.

Video encoder 20 and video decoder 22 each may be implemented as one or more processors, digital signal processors, application specific integrated circuits (ASICs), field programmable gate arrays (FPGAs), discrete logic, software, hardware, firmware or any combinations thereof. Each of video encoder 20 and video decoder 22 may be included in one or more encoders or decoders, either of which may be integrated as part of a combined encoder/decoder (CODEC) in a respective subscriber device, broadcast device, server, or the like. In addition, 3D video source device 12 and 3D video output device each may include appropriate modulation, demodulation, frequency conversion, filtering, and amplifier components for transmission and reception of encoded video, as applicable, including radio frequency (RF) wireless components and antennas in the case of wireless communication. For ease of illustration, however, such components are not shown in FIG. 1.

To support 3D video, video encoder 20 encodes a left component and a right component of the 3D video. The left component corresponds to a component that is visually perceived by the left eye of a human viewer. The right component corresponds to a component that is visually perceived by the right eye of a human viewer. Together, the left and right components are visually integrated by the human viewer to produce an overall 3D view of a stereo image. The left component may generally refer to at least a portion of a 3D video frame configured for viewing by a left eye. Similarly, the right component may generally refer to at least a portion of a 3D video frame configured for viewing by a right eye. Each component includes data defining at least a portion of a video frame such that combination of the video frames associated with the left and right components produces the overall 3D stereo video frame. In addition, each component may include a video block or a plurality of video blocks, such as macroblocks (MBs) that form the left or right frame. In some cases, for a stereoscopic display with color filtering glasses, the left component may correspond to red color data and the right component may correspond to blue and green color data, i.e., in anaglyph form. Hence, the left component may carry the red color data from the frame and the right component may carry the blue and green color data from the frame.

Video encoder 20 separately encodes the left component and the right component using, e.g., MPEG 4 or H.264 encoding, and transmits the encoded components to 3D video output device 14 for decoding by 3D video decoder 22. The decoded left and right 3D video components are used to drive 3D video display 24 to produce 3D video, either directly or in conjunction with additional display accessories, such as stereoscopic glasses or viewfinders. Video display 24 may include any type of display, such as a liquid crystal display (LCD), organic light emitting diode (OLED), or plasma display, as well as associated display driver hardware, firmware and software. The visual quality of the 3D video may be dependent not only on the 3D source video, but also on the encoding process applied to the left and right components of the 3D source video, and the characteristics of the display device.

In accordance with this disclosure, video encoder 20 may be configured to enhance or maintain overall visual quality of the stereo 3D video produced by left and right components of a 3D video frame. In some aspects, video encoder 20 may be configured to apply a weighted bit allocation scheme to reduce overall perceptual distortion in the stereo video produced by the left and right components. The weighted bit allocation scheme may be preconfigured with a weighting factor that is derived from analysis of the relative contributions of distortion in the left and right components to overall perceptual distortion in the stereo image, e.g., for a given display device. The weighting may be based on sensitivity of a human viewer to distortion in the left and right components. Given a frame-level bit budget and the weighting factor, video encoder 20 applies the bit allocation scheme to allocate coding bits to the left and right components to reduce overall distortion in the encoded 3D video. The number of bits allocated to the respective left and right components governs the effective coding rates of such components. The bit allocation scheme may allocate bit allocation values such as rho domain values or quantization parameter (QP) values to allocate the coding bits to the left and right components. An increase in the number of coding bits allocated to a given video block or frame increases the effective coding rate of the video block or frame. A reduction in the number of bits used for one component (such as the right) along with a commensurate increase in the number of bits used for the other component (such as the left), for example, may increase the overall quality metric in some cases. Video encoder 20 supports stereo video coding with adjustable bit allocation to enhance or maintain 3D visual quality.

The bit allocation scheme may operate in the quantization parameter (QP) domain, the ρ(rho) domain, or some other bit allocation domain to allocate bit allocation values and thereby adjust the coding rates for the left and right 3D video components based on the quality metric. With rho domain bit allocation, for example, the ρ parameter represents the number of non-zero quantized AC transform coefficients in a video block, such as an MB. A macroblock is a video block that forms part of a frame. The size of the MB may be 16 by 16 pixels. However, other MB sizes are possible, as well as sub-partition sizes such as 16×8, 8×16, 8×8, 4×8, 8×4, 4×4, and the like. Macroblocks will be described herein for purposes of illustration, with the understanding that macroblocks or other video blocks may have a variety of different sizes. Rate control in the ρ domain tends to be more accurate than rate control in the QP domain. However, QP domain bit allocation may be used in some cases. The ρ domain or QP domain bit allocation, based on the quality metric, can be used to achieve effective control of coding bits allocated to the left and right 3D video components, respectively, while adhering to the overall frame-level bit budget specified for the applicable video frame. In this disclosure, ρ domain bit allocation will generally be described for purposes of example, without limitation as to the particular bit allocation domain, ρ, QP or otherwise, used to allocate coding bits between the left and right components of a 3D image.

3D video output device 14 may be implemented as any of a variety of wired or wireless devices, such as wireless mobile terminals or wired terminals equipped for video streaming, video broadcasting and/or video telephony. Examples of wireless mobile terminals include mobile radio telephones (e.g., so-called camera phones or video phones), mobile personal digital assistants (PDAs), mobile computers, mobile gaming devices, mobile televisions, or other mobile devices equipped with wireless communication capabilities and video encoding and/or decoding capabilities. Examples of wired terminals include desktop computers, video telephones, network appliances, set-top boxes, gaming consoles, interactive televisions, or the like. 3D video source device 12 may be a video streaming server, a video broadcast server, or a wired or wireless terminal, similar to 3D video output device 14. Either device 12, 14 may be configured to send video information, receive video information, or send and receive video information.

In video streaming, video broadcasting, or video telephony, and particularly mobile video streaming, broadcasting or telephony by wireless communication, bandwidth is a significant concern as extremely low bitrates are often required. In particular, communication channel 16 may have limited bandwidth, making the effective real-time transmission of quality video sequences over channel 16 very challenging. Communication channel 16, for example, may be a wireless communication link with limited bandwidth due to physical constraints in channel 16, or possibly quality-of-service (QoS) limitations, delay constraints, buffer status, or bandwidth allocation constraints imposed by the provider of communication channel 16. In addition, channel conditions may change due to location or channel traffic, resulting in changes in bandwidth.

Channel conditions, QoS limitations, carrier requirements, delay constraints, buffer status and other constraints may result in a frame-level bit budget that governs the maximum number of bits that can be allocated to a given 3D video frame. Selective, differential allocation of encoding bits between the left and right components of the 3D video can enhance or maintain the visual quality of the 3D video, given a particular frame-level bit budget and the asymmetric distortion response of a human viewer to the left and right components. For example, selective allocation of more coding bits to the left or right channel may result in visual quality improvement. In other words, rather than split the bit budget evenly between the left and right components, allocating more bits to one component than the other may enhance visual quality due to the human cognitive color interpolation mechanism. Again, the visual effect of distortion on the left component versus the right component may be substantially different due to asymmetric dominance between the left and right eyes in response to distortion.

Figure 2:
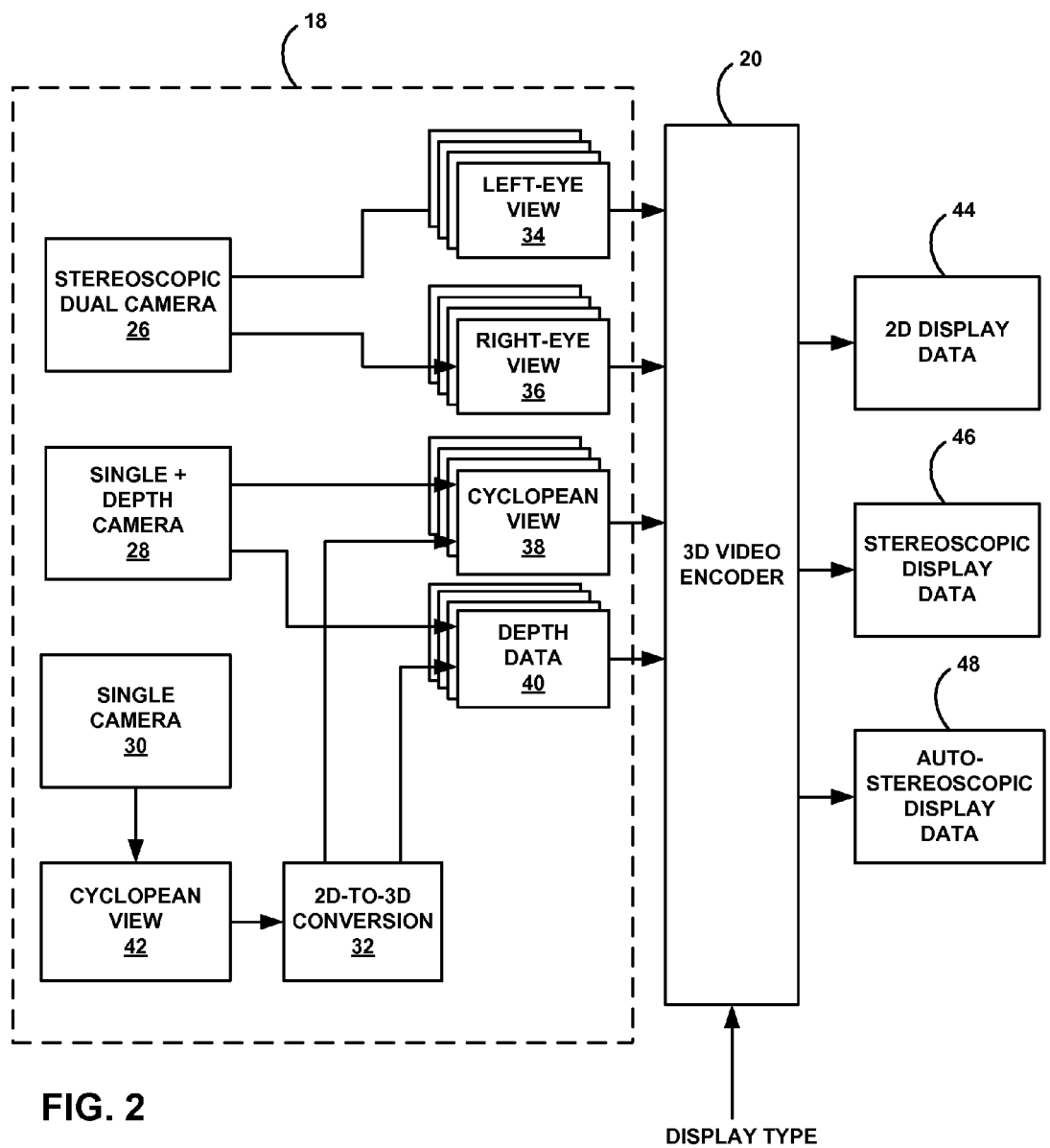
FIG. 2 is a block diagram illustrating different techniques for 3D video generation, encoding and presentation.

FIG. 2 is a block diagram illustrating different techniques for 3D video generation, encoding and presentation. In general, sources of 3D video content can be separated into three categories: (1) stereoscopic dual camera 26, (2) conventional single camera with depth camera 28 and (3) conventional single camera 30 with 2D-to-3D conversion 32. Stereoscopic dual camera 26 captures stereo video with two cameras simultaneously in real time, and tends to create the best 3D-like perception among end viewers. The use of a single camera and depth camera 28 is a less expensive solution. However, the video capture process performed by a single camera and depth camera 28 typically needs more time to estimate the depth of each object, and may not be able to record video in real time. The use of a single camera 30 with 2D-to-3D conversion 32 provides another inexpensive solution, and is backwards compatible with previously capture 2D video sequences. However, 2D-to-3D conversion can produce undesirable artifacts due to inaccurate depth estimation.

As shown in FIG. 2, stereoscopic dual camera 26 generates a left-eye view 34 and a right-eye view 36, i.e., left and right components, respectively. The combination of a single camera and depth camera 28 produces a cyclopean view 38 and depth data 40, respectively, for the video scene. Single camera 30 generates a cyclopean view 42 that is converted to a cyclopean view 38 and depth data 40 by 2D-to-3D conversion 32. Video encoder 20 encodes the left and right components 34, 36 produced by stereoscopic dual camera 26, the cyclopean view 38 and depth data 40 generated by single+depth camera 28, or the cyclopean view 38 and depth data 40 generated by single camera 30 and 2D-to-3D conversion 32, and generates one or more types of display data to drive a display device for visual presentation of the 3D video content.

For example, video encoder 20 may generate 2D display data 44, stereoscopic display data 46 and/or auto-stereoscopic display data 48. Stereoscopic display data 46 mimics the human cognitive color interpolation mechanism and forms the 3D video by showing different color channels, i.e., in anaglyph form, with a color-filtering device such as 3D eyeglasses or a viewfinder. The use of stereoscopic display data 46 is relatively inexpensive and produces visual quality that is generally acceptable. An autostereoscopic display tends to provide a more natural and better quality 3D experience, but is relatively expensive. The use of 2D display data 44 works well with existing 2D display devices, but may sacrifice visual quality.

3D video encoder 20 may be configured to transform, i.e., convert, the 3D video data produced by stereoscopic dual camera 26, single and depth camera 28 or single camera 30 and 2D-to-3D conversion module 22 to any of the display data types 44, 46, 48 shown in FIG. 2, other display data types. For a weighted bit allocation scheme, as described in this disclosure, the 3D video should be converted to stereo video comprising left and right video components that are combined to produce the stereo video. In some implementations, 3D video encoder 20 may receive a display type indication that indicates the type of display associated with 3D video display 24 in 3D video output device 14. If the indicated display type is stereoscopic, for example, 3D video coder 20 may transform the input 3D data, if necessary, to match the stereoscopic display type. For example, if the indicated display type is stereoscopic, 3D video coder 20 may convert cyclopean view data 38 and depth data 40 to stereoscopic display data 46 including left-eye and right-eye view data. As another example, if the indicated display type is 2D, 3D video coder 20 may convert left-eye view data 34 and right-eye view data 36 to 2D display data 44.

The display type indication may be obtained in a number of ways. For example, 3D video output device 14 may send a display type indication to 3D video source device 12, e.g., using in-band signaling or out-of-band signaling. In this case, 3D video encoder 20 receives the display type indication directly or indirectly from 3D video output device 14. Alternatively, the display type indication may be provided by a manufacturer, carrier or user, or assumed based on factors such as the type of source device, the type of destination device, the application for which the source device is used, and/or the region in which the source device is used. The display type indication may be used not only to select any necessary transforming of 3D content to an appropriate stereo output format, but also for selection of a weighting factor alpha for used in generation of a quality metric and/or application of a weighted bit allocation scheme, as described in this disclosure. Although 3D video encoder 20 may produce different types of 3D data such as data 44, 46, and 48 depicted in FIG. 2, the disclosure will generally describe encoding of stereoscopic display data 46 including left and right components for purposes of illustration.

In the encoding and stereo image reconstruction stages, several different types of visual degradation may occur. 3D video content requires more information than conventional 2D video to construct the stereo images. For example, 3D video content further requires depth information or dual video sources. Consequently, for a given bandwidth, higher compression ratios ordinarily will be required for 3D video to meet applicable frame-level bit budgets. Higher compression ratios may introduce more severe compression artifacts. In addition, the impact of such artifacts may vary according to the type of display technique used to present the 3D video. For example, visual artifacts may be more pronounced in a 2D display than in a stereoscopic display or autostereoscopic display. In addition, several new artifacts introduced by the process of stereo image construction, e.g., keystones, or cardboard effect, can degrade perceived visual quality. Generation of a quality metric can support objective assessment of visual quality and intelligent allocation of coding bits to reduce artifacts.

Figure 3A:
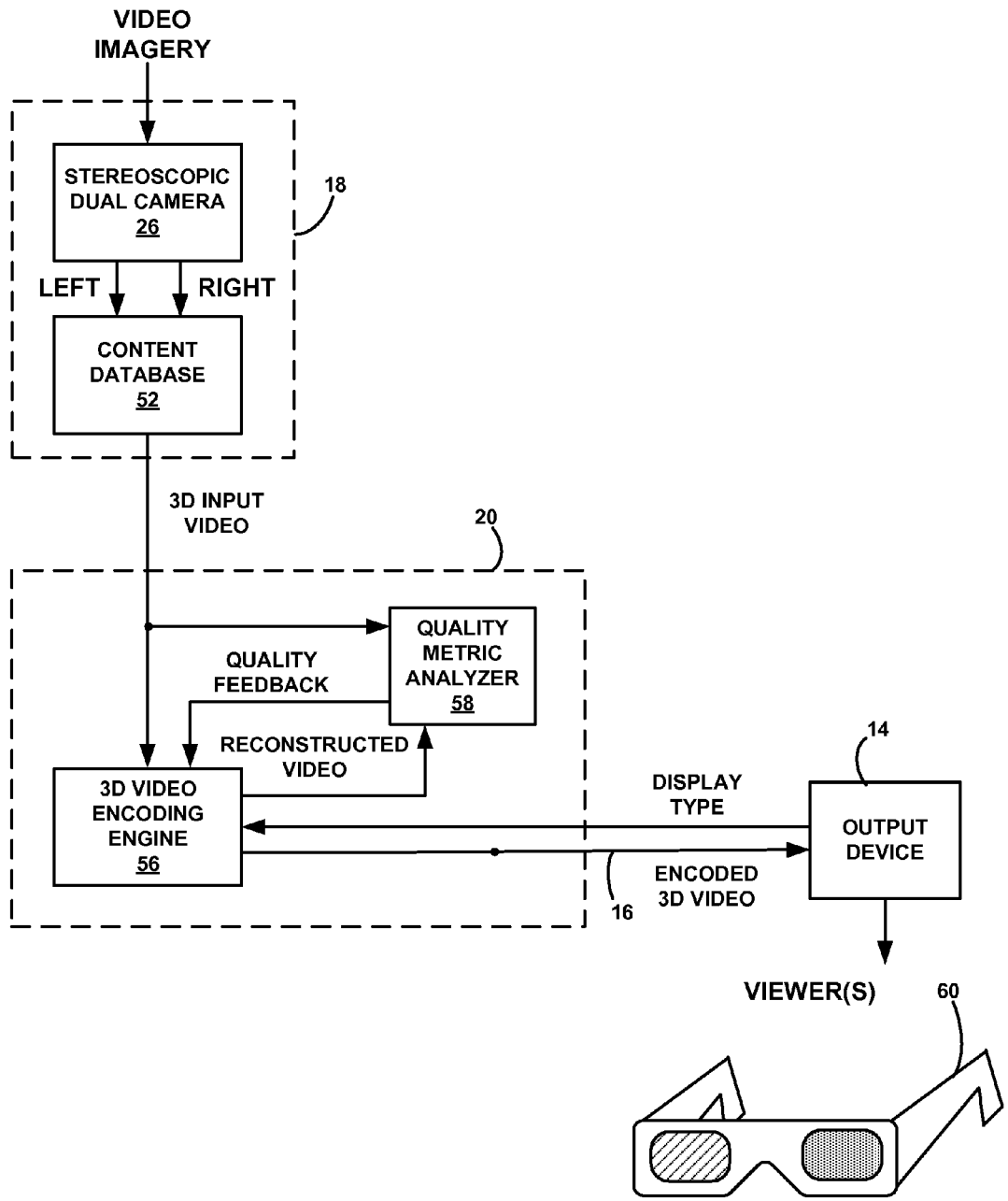
FIG. 3A is a block diagram illustrating 3D video generation by a stereoscopic dual camera for presentation via a stereoscopic display using a dual pass technique.

FIG. 3A is a block diagram illustrating 3D video generation by a stereoscopic dual camera 26 for presentation via a stereoscopic display using a dual pass technique. In the example of FIG. 3A, video encoder 20 compares 3D source (input) video to video reconstructed from encoded video to determine the quality of the encoded video, and generates quality feedback for use in encoding the video with acceptable quality. In other words, in a first pass, video encoder 20 generates an encoded video frame with an existing set of coding parameters, reconstructs the encoded frame and compares it to the source video. In a second pass, video encoder 20 re-encodes the video frame based on quality feedback derived from the comparison. For example, video encoder 20 may adjust a bit allocation between the left and right components if the quality feedback indicates that improvement is needed. Video encoder 20 may apply this dual-pass encoding process on a frame-by-frame basis to adjust the bit allocation.

Although the 3D video may be generated by other types of 3D video capture devices, or computer generated, use of stereoscopic dual camera 26 will be described for purposes of illustration. In the example of FIG. 3, stereoscopic dual camera 26 generates left and right 3D video components, and stores them in content database 52. Recording left and right video pairs in database 52 permits a video producer to make high quality video without considering the effect of different displays and compression issues. Video encoder 20 may be configured to encode stereo video frames including left and right components, and may handle any necessary transforming to produce the left and right components. However, the 3D input video typically will be provided by content database 52 in the form of stereo video comprising the left and right components. If 3D video is obtained by a stereoscopic dual camera, the left and right components are directly available. If the 3D video is obtained by a single camera with depth information, a conversion is necessary to produce the left and right components. Likewise, if a single camera obtains the 3D video, a conversion is necessary to produce the left and right components. 3D video encoder 20 includes a video encoding engine 56 that encodes the 3D video content from content database 52 using an encoding technique, such as MPEG4 or H.264, and applies a weighted bit allocation scheme designed to enhance perceptual visual quality of the stereo image produced by the left and right components.

In the example of FIG. 3A, quality metric analyzer 58 analyzes visual quality of the encoded video produced by 3D video encoding engine 56, and produces the visual quality metric as quality feedback to 3D video encoding engine 56. In particular, quality metric analyzer 58 may analyze distortion for left and right components of the encoded 3D video, upon reconstruction, relative to left and right components of the original source (input) 3D video. As will be described, 3D video encoding engine 56 uses the quality metric feedback to allocate coding bits between the left and right components according to a frame-level bit budget and quality metric-based bit allocation scheme, and thereby enhance or maintain perceptual visual quality for the human viewer. In particular, video encoding engine 56 may adjust the weighting for bit allocation based on the quality metric. Hence, video encoding engine 56 may allocate coding bits to adjust the coding rates for the left and right 3D video components based on the quality metric, and apply the adjusted coding rates to encode the left and right 3D video components. Video encoder 20 transmits the encoded left and right 3D video components to output device 14 via channel 16 to permit a user to view the left and right 3D video components in a combined stereo format.

Output device 14 receives and decodes the encoded 3D video via channel 16 and presents reconstructed 3D video to the human viewer or viewers. In the example of FIG. 3, output device 14 may include a stereoscopic video display aided by stereoscopic eyeglasses 60, a stereoscopic viewfinder, or any other equipment suitable for presentation of a stereoscopic 3D view. Stereoscopic glasses 60 may take a variety of forms such as two color anaglyph (red-blue/cyan) glasses, liquid crystal shutter glasses, polarized lens glasses, or headmount displays. In other aspects, output device 14 may include a 2D display or an auto-stereoscopic display. In each case, output device 14 may communicate the particular display type, general display category, or other useful information to 3D video encoding engine 56 for use in adjusting the bit allocation scheme to customize it for the type of display associated with output device 14.

In the example of FIG. 3A, glasses 60 are color filtering glasses having right (blue) and left (red) component lenses. Color filtering glasses 60 present reasonable costs and quality. The basic principle of operation for glasses 60, as is well known in the art, is that the glasses separated color into independent channels and presents the red and blue colors to the left and right eyes, respectively. The resulting stereo image is formed by the separated color channels and the human inherent visual mechanism. To construct an appropriate image file for a stereoscopic display with color filtering glasses 60, the red color is extracted from the left component image and the blue and green colors are extracted from the right component image, which is referred to as the anaglyph. The human viewer visually integrates the left and right component images to mentally generate the final stereo 3D color image.

The display type, including the display and any external hardware such as glasses, may have an impact on the degree and character of artifacts visible to the viewer, and therefore may be used to influence the bit allocation scheme to support better visual quality. As will be described, in some aspects, 3D video coding engine 56 may select a weighting factor based on the display type to control the weighting of bit allocation between a left component and a right component of the 3D video. The artifacts presented in the overall 3D video may be produced more dominantly by the left or right view. Therefore, weighted allocation of coding bits toward the view that has a greater effect on overall visual quality may be desirable. The weighting may be expressed in the bit allocation, the quality metric, or a combination of both. The weighted bit allocation, in combination with an overall 3D visual quality metric that takes into account distortion contributed by both the left and right components, can be effective in enhancing or maintaining visual quality.

Throughout this disclosure, depiction of different features as modules, blocks or components is intended to highlight different functional aspects of video encoder 20 and does not necessarily imply that such modules must be realized by separate hardware and/or software components. Rather, functionality associated with one or more modules, such as 3D video encoding engine 56 and quality metric analyzer 58, may be integrated within common or separate hardware and/or software components. In some cases, such features may be realized by common or separate software or software modules including code configured to cause a computer to perform the functions attributed to such features.

Figure 3B:
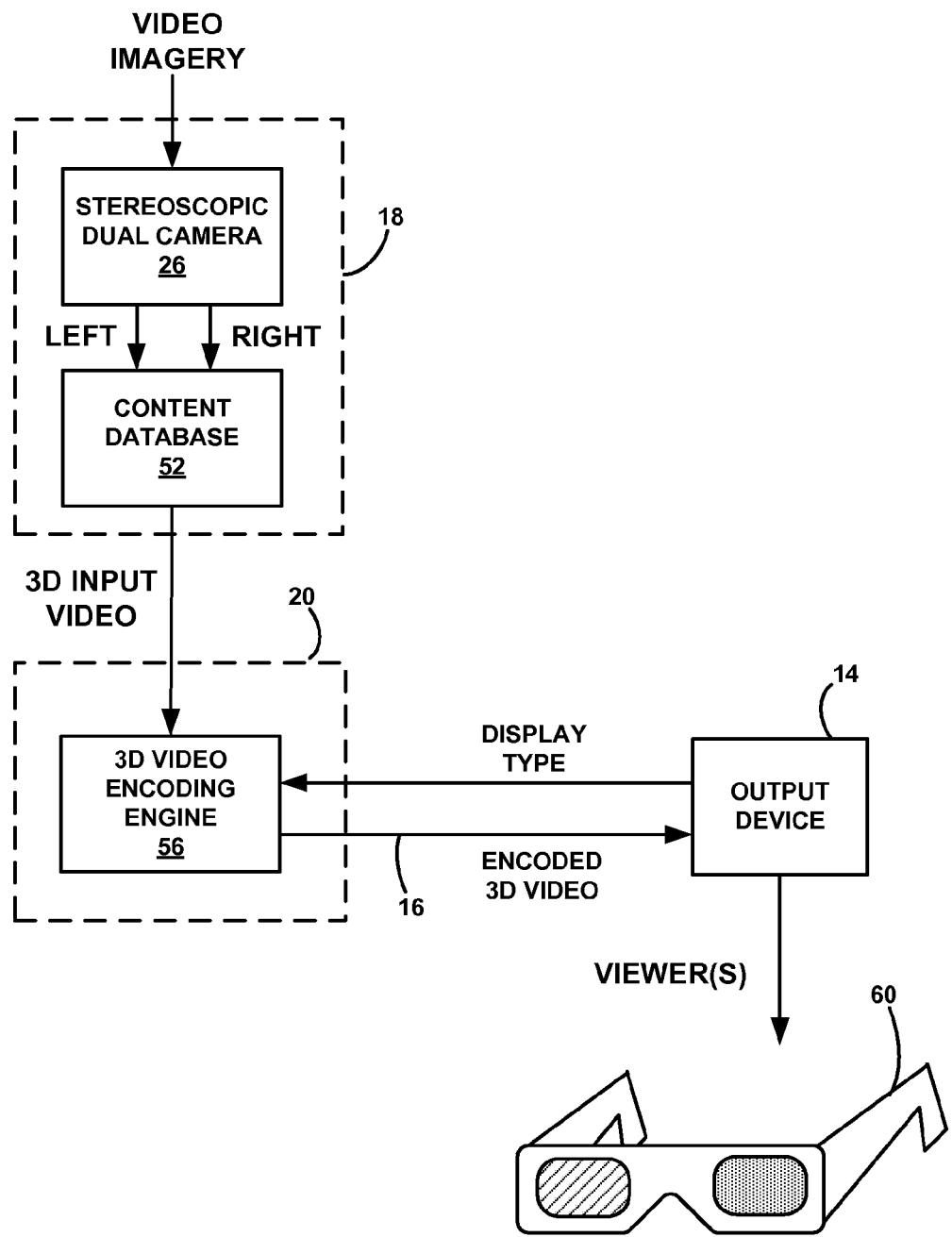
FIG. 3B is a block diagram illustrating 3D video generation by a stereoscopic dual camera for presentation via a stereoscopic display using an optimization technique.

FIG. 3B is a block diagram illustrating 3D video generation by a stereoscopic dual camera for presentation via a stereoscopic display using an optimization technique. FIG. 3B substantially conforms to FIG. 3A but illustrates an optimization-based bit allocation technique. 3D video encoder 20 receives and encodes stereo video frames including left and right components, and may handle any necessary transforming to produce the left and right components. As in the example of FIG. 3A, however, the 3D input video typically may be provided by content database 52 in the form of stereo video comprising the first and second components. In the example of FIG. 3B, video encoding engine 56 encodes the 3D video content from content database 52 using an optimization-based weighted bit allocation scheme designed to enhance perceptual visual quality of the stereo image produced by the left and right components.

Video encoding engine 56 receives the 3D video input video from content database 52 and an indication of display type, e.g., from output device 14. Using the display type indication, 3D video encoding engine 56 selects a weighting factor and produces a weighted allocation of encoding bits between the left and right components of the 3D input video. Using the weighted bit allocation, 3D video encoding engine 56 encodes the 3D input video and transmits the encoded video to output device 14, e.g., via channel 16. The optimization-based bit allocation scheme may be configured to minimize or at least reduce overall perceptual visual distortion of the encoded 3D video, given the distortion contributions of the left and right components of the 3D video. In particular, the weighting factor may be selected to compensate for the different relative contributions of the left and right components due to the asymmetric distortion response of the left and right human eyes, and the characteristics of the display, if applicable.

As in the example of FIG. 3A, output device 14 receives and decodes the encoded 3D video via channel 16 and presents reconstructed 3D video to the human viewer or viewers. Again, as in FIG. 3A, output device 14 of FIG. 3B may include a stereoscopic video display aided by stereoscopic eyeglasses 60, a stereoscopic viewfinder, or any other equipment suitable for presentation of a stereoscopic 3D view. If the display type, including the display and any external hardware such as glasses, is found to have a significant an impact on the degree and character of artifacts visible to the viewer, 3D video encoding engine 56 may select a weighting factor appropriate for the particular display device or display device characteristics. In any event, upon selection of an appropriate weighting factor, video encoding engine 56 provides weighted allocation of coding bits toward the view (left or right) that has a greater effect on overall visual quality may be desirable to enhance or maintain visual quality.

Figure 4:
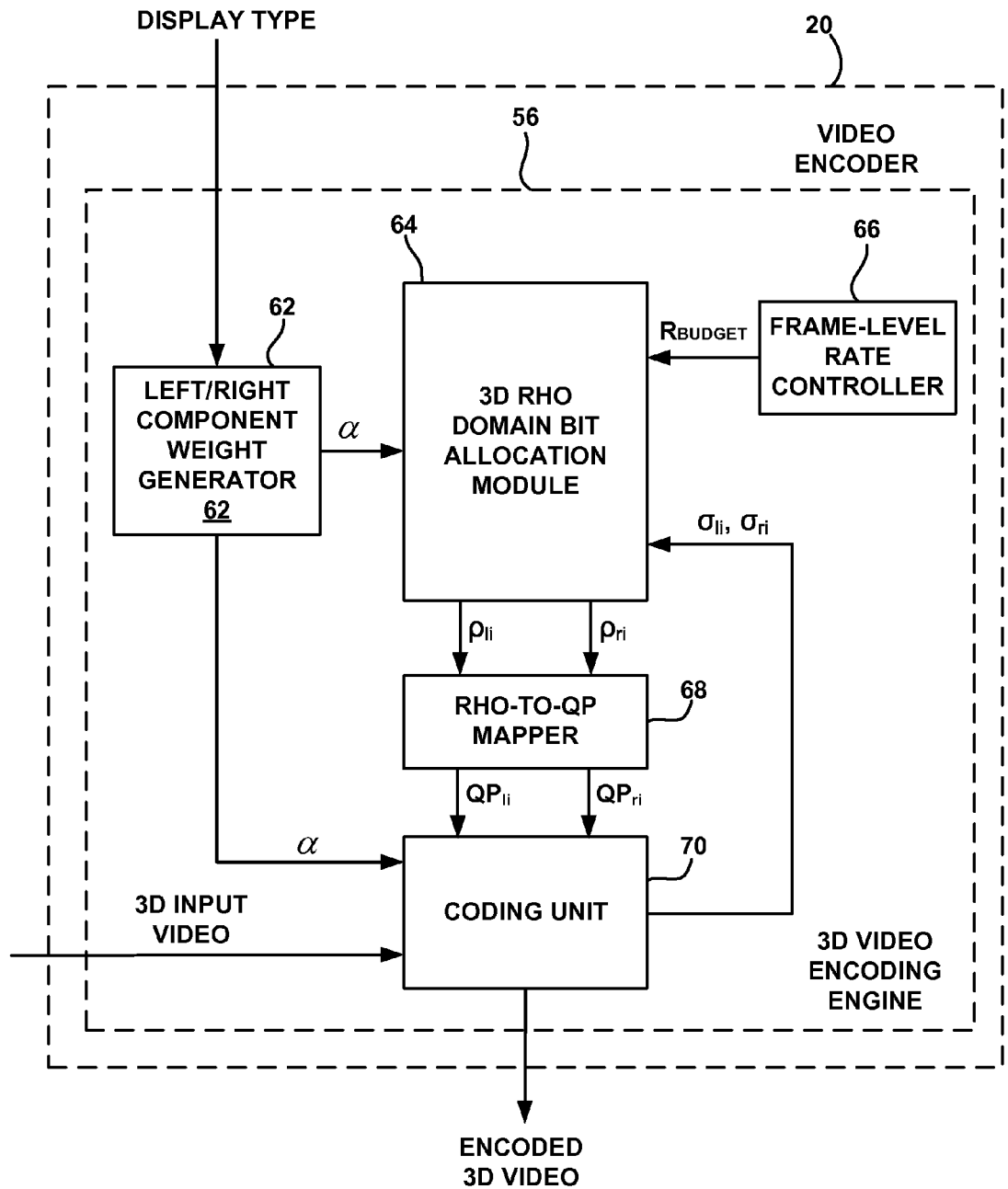
FIG. 4 is a block diagram illustrating a video encoding engine for generating encoded 3D video using an optimization technique.
Figure 5:
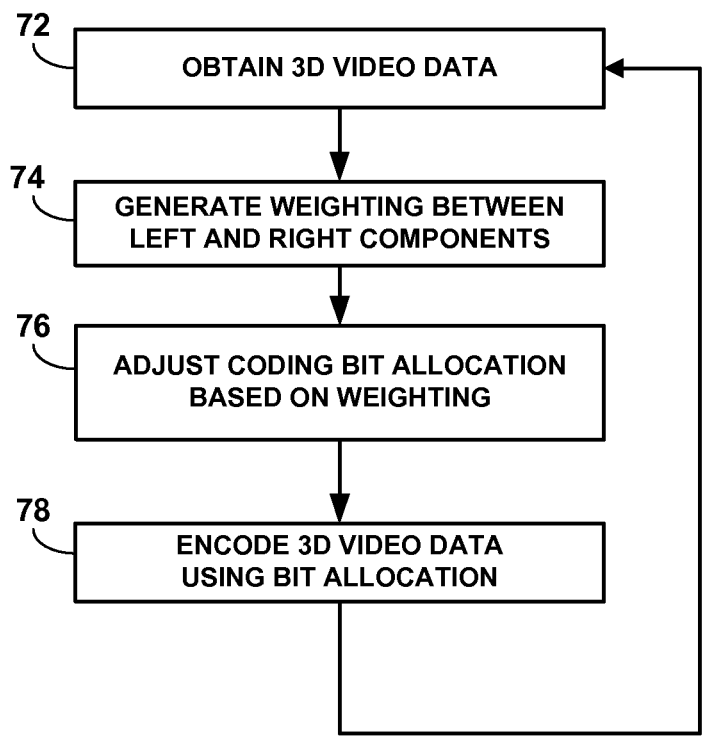
FIG. 5 is a flow diagram illustrating generation of a 3D video quality metric and allocation of coding bits based on the 3D video quality metric.

FIG. 4 is a block diagram illustrating a video encoding engine 56 for generating encoded 3D video within a 3D video encoder 20 using an optimization-based bit allocation scheme. As shown in FIG. 4, video encoding engine 56 may include a left/right component weight generator 62, 3D rho domain bit allocation module 64, frame-level rate controller 66, rho-to-QP mapper 68, and video coding unit 70. Video coding unit 70 forms part of the overall video encoder 20, along with left/right component weight generator 62, 3D rho domain bit allocation module 64, frame-level rate controller 66, rho-to-QP mapper 68, and is responsible for applying the coding bits according to a coding technique such as MPEG-4 or H.264 to produce the encoded video. As shown in FIG. 4, video coding unit 70 receives 3D input video and encodes the video to produce encoded 3D video. Left-right component weight generator 62 receives a display type indication and produces a weighting factor alpha for used by 3D rho domain bit allocation module 64 and coding unit 70. Bit allocation module 64 allocates bits to the left and right components of a 3D video frame based on the weighting factor.

Again, depiction of different features as modules, blocks or components is intended to highlight different functional aspects and does not necessarily imply that such modules must be realized by separate hardware and/or software components. In some cases, various aspects of video encoding engine 56 may be combined, work together, or be realized by shared hardware and/or software. Accordingly, the various components depicted in FIG. 4 may be formed in a variety of ways that encompass the functionality ascribed to each module. In any event, the various components of video encoder 20 may be realized in hardware, software, firmware, or a combination thereof. For example, such components may operate as software processes executing on one or more microprocessors or digital signal processors (DSPs), one or more application specific integrated circuits (ASICs), one or more field programmable gate arrays (FPGAs), or other equivalent integrated or discrete logic circuitry.

In the example of FIG. 4, left/right component weight generator 62 receives input indicating the display type associated with an output device 14 or group of output devices. As mentioned previously, the display type input may be actual display type input communicated by in-band or out-of-band signaling from output device 14. Alternatively, the display type input may be specified by a carrier, manufacturer, or user, or assumed based on factors such as the type of source device, the type of output device, the application for which the source device is used, and/or the region in which the source device or output device is used. Based on the display type, left/right component weight generator 62 generates a weight factor α that specifies a weighting preference toward the left component or right component for purposes of distortion analysis and, ultimately, bit allocation. For example, left/right component weight generator 62 may select the weight factor from a table or calculate the weight factor.

Video coding unit 70 receives the left and right components of the 3D input video, i.e., the original source 3D video. The left and right components may be received as video frames from the left and right components of a 3D video sequence. Using the weight factor α, as well as the frame-level bit budget $R_{BUDGET}$, 3D rho domain bit allocation module 64 produces bit allocation values for video blocks, e.g., macroblocks, within the left and right components of the 3D video frame. The bit allocation values may be rho domain values.

The weighting factor α may be a dominance factor that expresses the relative impact of the left and right components on the overall visual quality of the 3D video. In this example, if the red, green blue (RGB) image is constructed from anaglyph images and each color channel is obtained from a different camera, quality levels in the left and right components images have different contributions to the overall visual quality for viewers. For example, even if the same distortion is present in both the left component image and right component image, one of the images may have a dramatically different impact on visual quality due to the asymmetric dominance of one channel over the other given the perceptual qualities of the human eyes. Hence, if distortion in the first component (left or right) has a more significant impact on overall visual quality than distortion in the second component, 3D rho domain allocation module 64 may be configured to address the difference by allocating rho domain values so that additional bits are allocated to the first component to enhance visual quality.

The weighting factor α quantifies the degree to which a particular component (left or right) influences overall visual quality. If the distortion on the left component more strongly influences visual quality, α will be higher. On the other hand, if the distortion on the right component more strongly influences visual quality, α will be lower. Weighting factor α may be determined based on a quality metric that permits identification of the relative contributions of the left an right components to overall perceptual visual quality of the stereo image. Based at least in part on weighting factor α, 3D rho domain bit allocation module 64 biases the rho domain bit allocation between the left component and the right component of a video frame being encoded by video encoder 20. The allocation may be designated for individual video blocks, such as macroblocks (MBs), within a video frame, or for all video blocks within a frame. The allocation may be updated on a block-by-block basis or a frame-by-frame basis.

Rho domain bit allocation module 64 receives a frame-level rate budget $R_{BUDGET}$ from frame-level rate controller 66, and a standard deviation σ for the encoded MBs from video coding unit 70. The standard deviation σ may be the standard deviation of the actual residue obtained after motion estimation, and can be the stored residue statistics from previous frames. The standard deviation may be represented by standard deviation components for the left and right components. For example, the standard deviation may be expressed as left component standard deviation $\sigma_{li}$ and right component standard deviation $\sigma_{ri}$. Using weighting factor alpha, and standard deviations $\sigma_{li}$ and $\sigma_{ri}$ rho domain bit allocation module 64 distinguishes left component MBs from right component MBs for purposes of preferential rho domain bit allocation between the left and right components. Rho domain bit allocation module 64 generates a ρ (rho) parameter for each MB in each frame of the left component and right component. The ρ parameter represents the number of non-zero quantized AC transform coefficients in an MB. Rate control in the ρ domain tends to be more accurate than rate control in the QP domain.

Frame-level rate controller 66 generates an allocation of bits to individual frames within a video sequence. In particular, frame-level rate controller 54 generates a value $R_{BUDGET}$ that indicates the number of bits available for encoding all of the MBs within the present frame, including the left component and right component of the frame. Frame-level rate controller 66 may be a general rate controller that allocates bits to frames based on bandwidth requirements imposed by channel conditions, carrier requirements, quality of service (QoS) limitations, delay constraints, buffer status, or other requirements or conditions. Using the frame-level bit budget $R_{BUDGET}$, standard deviation σ, and weighting factor alpha, rho (ρ) domain bit allocation module 64 generates bit allocation values for blocks in the left and right components. In particular, in this example, rho domain bit allocation module 64 generates a ρ domain output indicating the ρ budget for each left component or right component MB as $\rho_{li}$ (ρ left image) and $\rho_{ri}$ (ρ right image), respectively. The ρ domain output is applied to ρ-to-QP mapper 68, which maps the $\rho_{li}$ and $\rho_{ri}$ values to corresponding QP values $QP_{li}$ and $QP_{ri}$ for each MB. Using the QP values $QP_{li}$ and $QP_{ri}$ for the MBs within the left and right components, respectively, of the frame, video coding unit 70 encodes the 3D input video to produce the encoded 3D video.

In the compression associated with encoding and the stereo image reconstruction stage, several degradations from different causes may be introduced. Because 3D video content ordinarily requires more information than conventional 2D information, e.g., image and depth information, or right and left information from dual video sources, higher compression ratios may be applied to satisfy applicable bit budgets. Therefore, more severe compression artifacts may be introduced by 3D coding for a given bandwidth. In addition, other artifacts may arise from the process of stereo image construction, which also degrade perceived quality. Rho domain bit allocation module 64 permits reduction of the artifacts produced by compression incident to encoding of 3D video. Example equations for use by rho domain bit allocation module 64 in generating a weighted bit allocation are described in more detail below.

For purposes of generating a quality metric, distortion can be analyzed by comparing original input video $f_l$ and reconstructed video $\tilde{f}_l$ for the left component, and comparing original input video $f_r$ and reconstructed video $\tilde{f}_r$ for the right component. Because of the asymmetric characteristic of a compressed stereo image, estimating quality by evenly averaging the peak signal-to-noise ratio (PSNR) from both the left and right images can be misleading. Therefore, the PSNR for a stereo image may be modified in order to predict the overall stereo image quality more accurately. In particular, the weighting factor α can be used to represent the different impacts produced by the left and right component and, in turn, can be employed to influence bit allocation by rho domain bit allocation module 64.

Set forth below is a discussion of an exemplary optimization technique that may be performed by the exemplary components of video encoding engine 56, and particularly rho domain bit allocation module 64, to allocate coding bits to the left and right components of a 3D image in a manner to enhances or maintains perceptual visual quality. In the following discussion, the values $D_L$ and $D_R$ denote the normalized per pixel distortion of the left and right components, respectively, of the stereo image. The weighting factor α indicates the perceptual importance factor of the left eye versus the right eye, and may be represented as a real number between 0 and 1.

The value of weighting factor α may be selected based on display type or display type characteristics and, more particularly, analysis of relative distortion contributions of left and right components for a particular display type or display type characteristics. Notably, if the display device is a 2D display that can only support 2D display data, e.g., like 2D display data 44 of FIG. 2, weighting factor α may be set to one or zero so that only one of the left and right components receives all of the coding bit allocation. In other words, if the display device cannot support 3D stereo video, bit allocation may revert to a scenario in which only one channel receives all of the coding bits, i.e., by setting weighting factor α to either zero or one. Otherwise, if the output device 14 has a display that supports stereo video, the value of weighting factor α will be a value between zero and one, as determined by analysis of relative distortion contributions of the left and right components to overall perceptual visual quality of the stereo image.

If the relationship among the variables mentioned is simplified as a linear function, then the quality metric can be expressed as the overall distortion of a video sequence, which may be represented by:

$$D = \alpha D_L(f_l, \tilde{f}_l) + (1-\alpha) D_R(f_r, \tilde{f}_r) \quad (1)$$

where $f_l$ and $\tilde{f}_l$ are the original and reconstructed left views, and $f_r$ and $\tilde{f}_r$ are the original and reconstructed right views. The reconstructed views are reconstructed from the encoded video components for comparison to the original source video. The quality metric can be formed by weighting the estimated quality $D_L$ of the left 3D video component with α and weighting the estimated quality $D_R$ of the right 3D video component with 1−α, or vice versa, and forming the quality metric based on the weighted qualities. The factor α may be a number, typically, between 0 and 1.

The question of whether the linear relationship in equation (1) is valid for the human vision perceptual perspective can be verified by experiment. In addition, the appropriate value of α may be determined by regression tests so that it is closely aligned with a majority of subjective human vision perceptions for a particular output display device or category of display device characteristics. The appropriate value of α may be different for different output display devices, different classes of display devices, different viewing applications or different users. Accordingly, left/right component weight generator 62 may adjust the weighting based on a type of display device used to view the left and right 3D video components. For example, left/right component weight generator 62 may calculate or select different values of α for different display type indications. Equation (1) can play an important role in stereo video coding and bit allocation, as the left/right weighted quality metric may be helpful as an input to derive an optimal coding parameter selection and bit allocation scheme that supports desirable subjective perceptual quality of the overall stereo 3D video.

A quality metric that takes into account the different contributions of the left and right components in stereo visual quality, e.g., as expressed in equation (1) above, may be useful in generally evaluating visual quality. However, such a quality metric may be especially useful in the video encoding process and, more particularly, for bit allocation by 3D rho (ρ) domain bit allocation module 64. If $R_{budget}$ produced by frame-level rate controller 66 denotes the total bit budget for the given dual left component and right component frames, and R is the bit rate for coding the frames, then the bit allocation problem addressed by bit allocation module 64 can be represented by:

$$\text{Minimize } \alpha D_L(f_l, \tilde{f}_l) + (1-\alpha) D_R(f_r, \tilde{f}_r), \text{ such that}$$
$$R \leq R_{budget}. \quad (2)$$

This optimization problem (2) can be solved by Lagrangian relaxation and dynamic programming, e.g., as described in H. Wang, G. M. Schuster, A. K. Katsaggelos, "Rate-distortion optimal bit allocation scheme for object-based video coding," IEEE Trans. Circuits System for Video Technology, Vol. 15, No. 9, pp. 1113-1123, September 2005. However, the computational complexity of such an approach typically will be higher than an existing real-time system can bear. Therefore, a low-complexity, near-optimal solution is preferred. In stereo video coding, let N denote the number of macroblocks in the frame, $\{\rho_{li}\}$, $\{\sigma_{li}\}$, $\{R_{li}\}$ and $\{D_{li}\}$ denote the set of ρ's, standard deviations, rates and distortions (sum of squared error) for the ith macroblocks in the left view, and $\{\rho_{ri}\}$, $\{\sigma_{ri}\}$, $\{R_{ri}\}$ and $\{D_{ri}\}$ denote the set of ρ's, standard deviations, rates and distortions (sum of squared error) for the ith macroblocks in the right view. The distortion $D_{li}$ represents the estimated quality of the encoded left 3D video component, and the distortion $D_{ri}$ represents the estimated quality of the encoded right 3D video component.

Based on the left and right distortion estimates, and the weighting factor alpha ($\alpha$), an overall quality metric for the stereo video frame formed by the left and right components can be formed. For example, the weighted distortion D of a stereo video frame can be represented by:

$$D = \sum_{i=1}^{N} (D_{li} + D_{ri}) = [\alpha D_L(f_l, \tilde{f}_l) + (1-\alpha)D_R(f_r, \tilde{f}_r)] * 255^2 * 384, \quad (3)$$

Hence, given equation (3), to support bit allocation by rho domain bit allocation module 64, problem (2) can be rewritten as:

Minimize D, such that $R \leq R_{budget}$. (4)

Problem (4) can be solved using a modeling-based bit allocation approach. As described in Berger, Rate Distortion Theory, Englewood Cliffs, N.J.: Prentice Hall, 1984, the distribution of AC coefficients in a nature image can be best approximated by a Laplacian distribution $$p(x) = \frac{\eta}{2} e^{-\eta|x|}.$$

Therefore, according to Z. He and S. K. Mitra, "A linear source model and a unified rate control algorithm for DCT video coding," IEEE Trans. Circuits System for Video Technology, Vol. 12, No. 11, pp. 970-982, November 2002, the rate and distortion of the ith macroblock can be modeled in equations (5) and (6) below as functions of $\rho$, e.g., as follows:

$$R_{li} = A\rho_{li} + B, \quad (5)$$

and $$R_{ri} = A\rho_{ri} + B, \quad (6)$$

where A and B are constant modeling parameters, and A can be considered the average number of bits needed to encode non-zero coefficients and B can be considered the bits due to non-texture information. In equations (5) and (6) above, a different value for B can be used for the left and right views. For simplification, however, the same value of B can be used for both the left and right views based on the assumption that the two views are quite similar. However, it is important to emphasize that the simplicity does not impact the generality of the derivation, because the value B is a constant value in the equations.

The estimated distortions of the left component and right component, respectively, may be represented by equations (7) and (8) below:

$$D_{li} = 384\sigma_{li}^2 e^{-\theta\rho_{li}/384}, \quad (7)$$

and $$D_{ri} = 384\sigma_{ri}^2 e^{-\theta\rho_{ri}/384}, \quad (8)$$

where $\theta$ is an unknown constant, but can be estimated from historical statistics, e.g., as the slope of a $\rho$-bitrate plot where bitrate=$\theta * \rho$. In equations (7) and (8), the values $\rho_{li}$ and $\rho_{ri}$ are optimized instead of quantizers because it is assumed that there is a sufficiently accurate $\rho$–QP table available to generate a decent quantizer from any selected $\rho_i$.

As described in this disclosure, equations (5)-(8) may be used to represent a set of rate-distortion representations expressed as functions of the coding parameter ($\rho$). These equations may be used to derive an optimal bit allocation strategy in the rho-domain for stereo video coding. The rho domain bit allocation strategy described in this disclosure is presented for purposes of illustration. However, other rate-distortion functions, either in the rho domain or in the quantization domain (QP), can be also used to derive bit allocation strategies using a given frame bit budget and a weighting between left and right components.

In general, equation (4) can be solved using Lagrangian relaxation in which the constrained problem is converted into an unconstrained problem as follows:

$$\underset{\rho_i}{\text{Minimize}} J_\lambda = \lambda R + D \quad (9)$$

$$= \sum_{i=1}^{N} [\lambda(R_{li} + R_{ri}) + \alpha D_{li} + (1-\alpha)D_{ri}],$$

$$= \sum_{i=1}^{N} [\lambda(A(\rho_{li} + \rho_{ri}) + 2B) + 384$$

$$(\alpha\sigma_{li}^2 e^{-\theta\rho_{li}/384} + (1-\alpha)\sigma_{ri}^2 e^{-\theta\rho_{ri}/384})]$$

where $\lambda^*$, the optimized lambda in equation (9), is the solution that enables $$\sum_{i=1}^{N} R_{li} + R_{ri} = R_{budget}.$$

By setting partial derivatives to zero in equation (9), the following expression can be obtained for the optimized $\rho_i$:

let $$\frac{\partial J_\lambda}{\partial \rho_{li}} = 0, \quad (10)$$

and $$\frac{\partial J_\lambda}{\partial \rho_{ri}} = 0 \quad (11)$$

which is $$\lambda A - \alpha\theta\sigma_{li}^2 e^{-\theta\rho_{li}/384} = 0, \quad (12)$$

Consequently, it follows that:

$$e^{-\theta\rho_{li}/384} = \frac{\lambda A}{\alpha\theta\sigma_{li}^2} \quad (13)$$

and:

$$\rho_{li} = \frac{384}{\theta}[\ln(\theta\sigma_{li}^2) - \ln(\alpha\lambda A)], \quad (14)$$

and similarly, $$\rho_{ri} = \frac{384}{\theta}[\ln(\theta\sigma_{ri}^2) - \ln((1-\alpha)\lambda A)]. \quad (15)$$

On the other hand:

$$R_{budget} = \sum_{i=1}^{N}(R_{li} + R_{ri}), \quad (16)$$

$$= \frac{384A}{\theta}\sum_{i=1}^{N}[\ln(\theta\sigma_{li}^2) + \ln(\theta\sigma_{ri}^2) - \ln(\alpha\lambda A) - \ln((1-\alpha)\lambda A)] + 2NB$$

Hence:

$$\ln(\lambda A) = \frac{1}{2N}\sum_{i=1}^{N}[\ln(\theta\sigma_{li}^2) + \ln(\theta\sigma_{ri}^2)] - \frac{\theta}{768NA}(R_{budget} - NB) - \frac{\ln\alpha + \ln(1-\alpha)}{2}. \quad (17)$$

From equations (14)-(17), bit allocation module 64 can be configured to obtain the bit allocations for the left and right components as follows:

$$\rho_{li} = \frac{384}{\theta}\left[\ln(\theta\sigma_{li}^2) - \frac{1}{2N}\sum_{i=1}^{N}\ln(\theta\sigma_{li}^2) + \frac{\theta}{768NA}(R_{budget} - NB) - \frac{\ln\alpha - \ln(1-\alpha)}{2}\right] \quad (18)$$

$$= \frac{R_{budget} - NB}{2NA} + \frac{384}{\theta}\left[\ln(\theta\sigma_{li}^2) - \frac{\sum_{i=1}^{N}\ln(\theta\sigma_{li}^2)}{2N} - \frac{\ln\alpha - \ln(1-\alpha)}{2}\right].$$

and similarly:

$$\rho_{ri} = \frac{R_{budget} - NB}{2NA} + \frac{384}{\theta}\left[\ln(\theta\sigma_{ri}^2) - \frac{\sum_{i=1}^{N}\ln(\theta\sigma_{ri}^2)}{2N} + \frac{\ln\alpha + \ln(1-\alpha)}{2}\right]. \quad (19)$$

Hence, in this example, bit allocation module 64 can generate rho (ρ) values $\rho_{li}$ and $\rho_{ri}$ for the left and right components, respectively, using equations (18) and (19) above. Notably, given the weighting factor α and differing degrees of distortion in the left and right components, the amounts of coding bits allocated to the left and right 3D video components may be different. In other words, if the rho (ρ) values specified by bit allocation module 64 are different, the effective coding rates for the left and right components are different. Bit allocation module 64 may be configured to apply equations (18) and (19) to produce the left and right component rho values $\rho_{li}$ and $\rho_{ri}$. Once the values of $\rho_{li}$ and $\rho_{ri}$ are determined for macroblocks (MBs) in the left and right components of the 3D stereo video frame, the corresponding quantization parameters (QPs) can be decided accordingly based on a historical ρ-QP table provided by ρ-to-QP mapper 68. In particular, ρ-to-QP mapper 68 maps the rho values $\rho_{li}$ and $\rho_{ri}$ to corresponding QP values $QP_{li}$ and $QP_{ri}$, respectively, for each MB. Mapper 68 may use a lookup table, as described above, to convert the rho (ρ) values to corresponding QP values for use by video coding unit 70. Alternatively, mapper 68 may use a mathematical function.

Experiments conducted on numerous stereo images and videos recorded using dual-cameras, and viewed using red-blue glasses, verified the efficacy of the quality metric and bit allocation scheme described in this disclosure. The experiments included three major components: (1) verification that the linear relationship set forth in equation (1) meets the "expected" normal human perception; (2) determination of the appropriate a weighting factor in equation (1) by regression tests; and (3) evaluation of the optimal bit allocation scheme by comparing it to general image and video coding methods without considering the combined perceptual quality measure from both views.

For verification of the linear relationship in equation (1), subjective tests indicated that the linear relationship corresponds to common human perception. As the α weighting factor is adjusted between 0 and 1, the correspondence between the objective quality score from equation (1) and visual perceived quality changes significantly. The stereo images formed by a combination of compressed left and right images with different quality levels were evaluated. The compression method used was JPEG2000. The quality level controls the compression efficiency and the associated output quality, which varied from 1 to 100. Higher values indicate better quality and lower compression ratio. The quality levels of the left and right component images were set to 5 and 100, respectively, and different quality combinations of stereo images were formed.

The human perceived quality of the stereo image formed from the left and right component images would be expected to be very similar because the same quality loss was introduced in both images with almost the same content but in different eyes (left and right). However, subjective observation showed that human eyes have very different sensitivity to the overall quality degradation between the left and right images. In particular, when the left image quality was set to 5 and the right image quality was set to 100, the stereo image quality was much better than when the left image quality was set to 100 and the right image quality was set to 5. In particular, distortion was much more observable in the stereo image when the left image quality was set to 100 and the right image quality was set to 5. The same distortion applied on left and right images can cause dramatically different impact for end viewers because human eyes have asymmetric dominance in responding to distortion from the left and right eyes. Accordingly, differential bit allocation between the left and right components can be applied, in view of the asymmetric dominance, with an appropriate weighting factor α to support better overall visual quality in the resulting stereo 3D image.

The factor α can be thought of as a human viewer's sensitivity to the distortion from the left and right images, where higher α means the human has less tolerance to distortion. Hence, the weighting is based on sensitivity of a human viewer to distortion in the left and right components. A subjective experiment of stereo images formed by left and right images with different distortion combinations has been performed. The output is a Mean-Opinion-Score (MOS), which ranges from 1 to 5, where higher value means better quality. In order to ensure high reliability of the test, only the quality levels 5, 15, 20, 30, 50, and 100 were used for both left and right images to avoid making testers fatigued. In this case, 6×6=36 different combinations of stereo images were generated for each scene. The 'proper' α value can be determined for a particular 3D video source and output device using a parameter fitting method with the perceptual distortion model:

$$MOS = \alpha[\gamma_l D_L(f_l, \tilde{f}_l) + \phi_l] + (1-\alpha)[\gamma_r D_R(f_r, \tilde{f}_r) + \phi_r],$$

where $\gamma_l$, $\phi_l$, $\gamma_r$, and $\phi_r$ are the factors to normalize the distortion output within 1 to 5 to fit with MOS data. The parameters were obtained by a regression test with the least squares method. Furthermore, the $\alpha$ values may be adjusted according to different output devices. Hence, as described previously, $\alpha$ display type indication may be used to trigger selection or calculation of a particular a value. For example, a pre-defined table of $\alpha$ values can be used to select an appropriate weighting factor ($\alpha$) in response to the type of display.

For dual camera stereoscopic video capture and an output device relying on a display screen and red-blue stereoscopic eyeglasses, it was found that an $\alpha$ value of approximately 0.3 may be particularly effective in producing desirable visual results. This result is generally consistent with the contribution of red, green, and blue color components to the pixel intensity as shown in the equation below:

$$\text{Luminance} = 0.257R + 0.504G + 0.098B + 16, \quad (20)$$

and is reasonable because the left lens (red lens) guides most of the red light into the left eye and the right glass (blue lens) guides most of the green and blue light into the right eye, while human eyes are more sensitive to green light from the right eye and less sensitive to the light from the left eye. The eyes tend to be more sensitive to the distortion from the right view than those from the left view. In that sense, the $\alpha$ value selection should be given lower weights to the distortions from the left view, which corresponds to the basic assumption for equation (1). In other words, the $\alpha$ weighting factor in equation (1) ordinarily should be selected so that distortion in the left component is given less weight than distortion in the right component for purposes of generating a quality metric and performing differential bit allocation between the left component and right component.

A number of results were considered for a bit allocation scheme guided by a perceptual quality metric, as described herein, versus a bit allocation scheme that did not rely on a perceptual quality metric. Coding left and right component images based on the expected subjective importance can substantially improve the quality by spending the same amount of coding bits but allocating different amounts of bits between the left and right components. Allocation of more coding bits to the right component than to the left component resulted in higher overall visual quality in the stereo image, when compared to allocation of more coding bits to the left component than to the right component. The frame size for the left and right components, in terms of number of kilobits, is approximately equal, but the subjective visual quality impact is very observable. Accordingly, a quality metric and bit allocation scheme as described in this disclosure can be effective in enhancing the overall visual quality of a stereo image produced from left and right component images.

For dual camera stereoscopic video capture and an output device relying on a display screen and red-blue stereoscopic eyeglasses, it was found that an $\alpha$ value of approximately 0.3 may be particularly effective in producing desirable visual results. This result is generally consistent with the contribution of red, green, and blue color components to the pixel intensity as shown in the equation below:

$$\text{Luminance} = 0.257R + 0.504G + 0.098B + 16, \quad (20)$$

and is reasonable because the left lens (red lens) guides most of the red light into the left eye and the right glass (blue lens) guides most of the green and blue light into the right eye, while human eyes are more sensitive to green light from the right eye and less sensitive to the light from the left eye. The eyes tend to be more sensitive to the distortion from the right view than those from the left view. In that sense, the $\alpha$ value selection should be given lower weights to the distortions from the left view, which corresponds to the basic assumption for equation (1). In other words, the $\alpha$ weighting factor in equation (1) ordinarily should be selected so that distortion in the left component is given less weight than distortion in the right component for purposes of generating a quality metric and performing differential bit allocation between the left component and right component.

Figure 6:
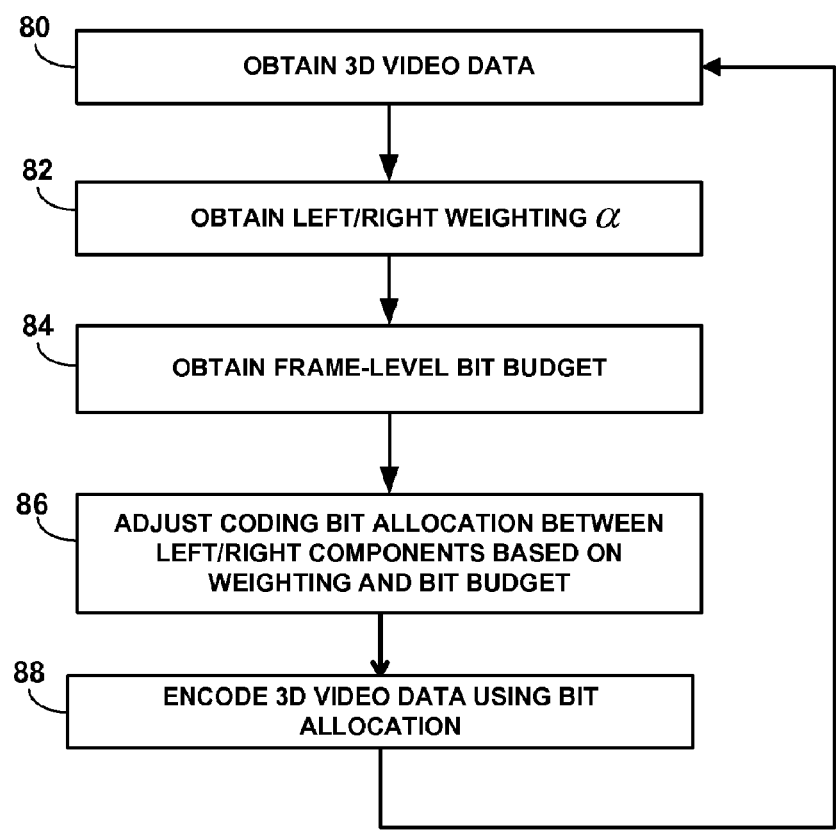
FIG. 6 is another flow diagram illustrating allocation of coding bits to 3D video components based on a 3D video quality metric.

FIG. 6 is another flow diagram illustrating allocation of coding bits to 3D video components based on a 3D video quality metric. As shown in FIG. 6, video encoder 20 obtains 3D video data (80). In this example, left/right component weight generator 62 obtains left/right weight factor $\alpha$ (82), e.g., as a default value, a user-specified value, a value determined based on a display type indication. The display type indication may be provided by output device 14, indicated by a manufacturer, carrier or user, or assumed based on factors such as the type of source device, the type of destination device, the application for which the source device is used, and/or the region in which the source device or output device is used. Bit allocation module 64 obtains the frame-level bit budget from frame-level rate controller 66 (84). Bit allocation module 64 adjusts the coding bit allocation between the left and right components based on the left/right weight factor $\alpha$ and the bit budget (86). The encoding process then applies an updated coding bit allocation. In particular, coding unit 70 uses the bit allocation to encode the 3D video data (88), e.g., according to a video coding method such as MPEG4 or H.264 coding.

Figure 7:
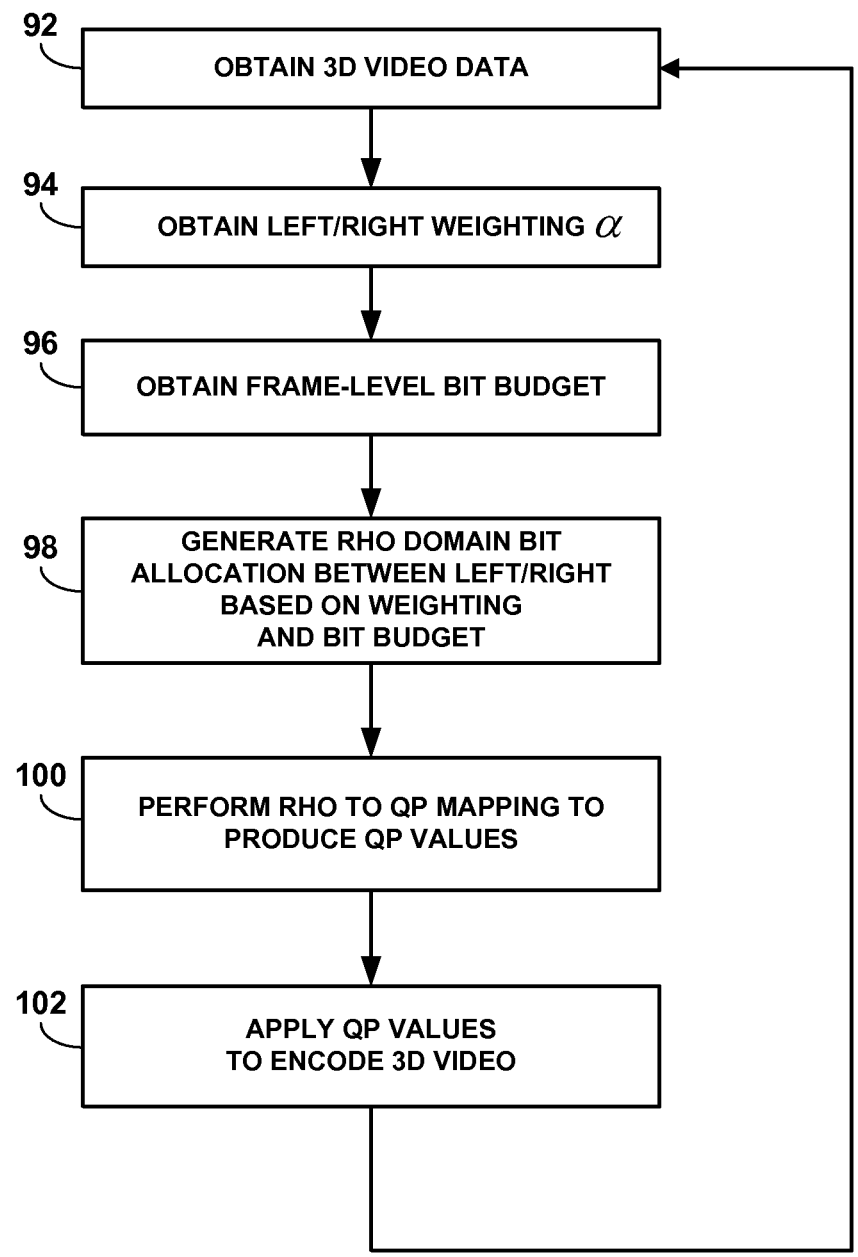
FIG. 7 is a flow diagram illustrating allocation of coding bits to 3D video components in the rho ($\rho$) domain.

FIG. 7 is a flow diagram illustrating allocation of coding bits to 3D video components in the rho ($\rho$) domain. Bit allocation in the rho ($\rho$) domain is desirable for purposes of accuracy. However, bit allocation could be performed entirely within the QP domain, if desired. For rho ($\rho$) domain bit allocation, video encoder 20 obtains 3D video data (92), obtains the left/right weight factor $\alpha$ (94), and obtains a frame-level bit budget (96) Again, some or all of such operations may be performed by constituent components or modules of video encoder 20. Upon obtaining the frame-level bit budget (96), bit allocation module 64 generates the rho domain bit allocation between the left and right components of the 3D video (98) using the weight factor $\alpha$ and the bit budget. Rho-to-QP mapper 68 then maps the rho values to corresponding QP values (100), and video coding unit 70 applies the QP values to encode the 3D video (102). The encoding process continues according to frame-based or block-based adjustments to the bit allocation.

In some aspects, video encoder 20 may support transforming of 3D video data to different stereo formats based on an indication of output display type. For example, video encoder 20 may obtain 3D video data and determine a display type associated with an output device 14. Based on the display type, video encoder 20 determines whether any transforming, e.g., from one stereo format to another stereo format, is necessary. If transforming is necessary, video encoder 20 selects the appropriate stereo format based on the indicated display type, and changes the 3D video data to the selected stereo format.

Video encoder 20 then may encode the new 3D video data. The video may be encoded according to a video coding method such as MPEG4 or H.264 coding. Video transforming may permit 3D video content to be changed into various stereo formats depending on the characteristics of the output device 14 designated to received the 3D video content. For example, if the 3D video content is recorded in content database 52 as single camera information plus depth information, video transforming may convert the 3D video content into right and left components appropriate for presentation via a stereoscopic display, if it is found that output device 14 includes a stereoscopic display. Similarly, if output device 14 includes a 2D display, and the 3D video content is recorded in database 52 as stereoscopic video content, transforming may convert the stereoscopic data to 2D data appropriate for the 2D display. In general, transforming may rely on an indication of display type to determine whether transforming is necessary and, if so, which stereo format should be selected for transforming. As described in this disclosure, the indication of display type may be provided by output device 14, or indicated by a carrier, manufacturer, user, application type, region, device type, or the like.

This disclosure describes a framework for 3D video content compression and rendering, which may be applicable to a wide range of devices such as next generation mobile phones equipped with 3D video capabilities. Using a perceptual quality metric that considers different contributions of left and right components of 3D video, and a bit allocation scheme based on the quality metric, similar stereo video content may be provided to different viewers using different displaying formats and display devices. The 3D source video may be captured or rendered in different ways but stored in a common database so that video producers can generate high quality videos without necessarily addressing the effects of different displays and compression associated with encoding. Rather, a video encoder may be provided to perform any necessary transforming of the source video to appropriate stereo formats associated with output devices designated to receive the video.

In addition, or alternatively, the video encoder may be equipped to generate a quality metric and adjust coding bit allocation between left and right components of the video to address distortion caused by artifacts and display characteristics. In particular, a video decoder as described in this disclosure may dynamically adjust the compression ratio, via bit allocation, and the expected viewer's perceived video quality to meet a bit budget while achieving acceptable visual perceptual quality. In order to balance compression ratio and perceive quality, a quality metric for stereo images may be used as defined in this disclosure. Guided by the metric, a rate control mechanism embodied by a bit allocation scheme can be applied to control the coding bits and the quality distortion cause by compression.

The techniques described herein may be implemented in hardware, software, firmware, or any combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise a data storage medium such as RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other computer-readable data storage medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various aspects of the disclose video coding techniques have been described. These and other aspects are within the scope of the following claims.

The invention claimed is:

1. A method comprising:
 obtaining a frame budget defining a number of encoding bits available for a 3D video frame; and
 generating bit allocation values for a bit allocation domain of a plurality of bit allocation domains for blocks within left and right components of the 3D video frame based on the frame budget and a weighting between the left and right components, the weighting based on a contribution of distortion from the left and right components to a distortion of the 3D video frame;
 mapping the bit allocation values for the bit allocation domain to corresponding quantization parameter (QP) values; and
 allocating a number of encoding bits to each of the blocks in the left and right components based on the mapping.

2. The method of claim 1, wherein the plurality of bit allocation domains includes a rho domain.

3. The method of claim 2, further comprising encoding the blocks in the left and right components using the allocated encoding bits.

4. The method of claim 2, further comprising allocating different amounts of the encoding bits to the left and right components based on the weighting.

5. The method of claim 1, further comprising adjusting the weighting based on a type of display device used to view the left and right components.

6. The method of claim 5, further comprising receiving an indication of the type of display device from an output device to which the 3D video frame is transmitted.

7. The method of claim 1, wherein the weighting is based on sensitivity of a human viewer to distortion in the left and right components.

8. A device comprising:
a video encoder configured to:
obtain a frame budget defining a number of encoding bits available for a 3D video frame,
generate bit allocation values for a bit allocation domain of a plurality of bit allocation domains for blocks within left and right components of the 3D video frame based on the frame budget and a weighting between the left and right components, the weighting based on a contribution of distortion from the left and right components to a distortion of the 3D video frame,
map the bit allocation values for the bit allocation domain to corresponding quantization parameter (QP) values, and
allocate a number of encoding bits to each of the blocks in the left and right components based on the mapping.

9. The device of claim 8, wherein the plurality of bit allocation domains includes a rho domain.

10. The device of claim 9, wherein the video encoder is configured to encode the blocks in the left and right components using the allocated encoding bits.

11. The device of claim 9, wherein the video encoder is configured to allocate different amounts of the encoding bits to the left and right components based on the weighting.

12. The device of claim 8, wherein the video encoder is configured to adjust the weighting based on a type of display device used to view the left and right components.

13. The device of claim 12, wherein the video encoder is configured to receive an indication of the type of display device from an output device to which the 3D video frame is transmitted.

14. The device of claim 8, wherein the weighting is based on sensitivity of a human viewer to distortion in the left and right components.

15. A device comprising:
means for obtaining a frame budget defining a number of encoding bits available for a 3D video frame;
means for generating bit allocation values for a bit allocation domain of a plurality of bit allocation domains for blocks within left and right components of the 3D video frame based on the frame budget and a weighting between the left and right components, the weighting based on a contribution of distortion from the left and right components to a distortion of the 3D video frame;
means for mapping the bit allocation values for the bit allocation domain to corresponding quantization parameter (QP) values; and
means for allocating a number of encoding bits to each of the blocks in the left and right components based on the mapping.

16. The device of claim 15, wherein the plurality of bit allocation domains includes a rho domain.

17. The device of claim 16, further comprising means for encoding the blocks in the left and right components using the allocated encoding bits.

18. The device of claim 16, further comprising means for allocating different amounts of the encoding bits to the left and right components based on the weighting.

19. The device of claim 15, further comprising means for adjusting the weighting based on a type of display device used to view the left and right components.

20. The device of claim 19, further comprising means for receiving an indication of the type of display device from an output device to which the 3D video frame is transmitted.

21. The device of claim 15, wherein the weighting is based on sensitivity of a human viewer to distortion in the left and right components.

22. A computer program product comprising a computer-readable, non-transitory medium comprising code to cause a computer to:
obtain a frame budget defining a number of encoding bits available for a 3D video frame;
generate bit allocation values for a bit allocation domain of a plurality of bit allocation domains for blocks within left and right components of the 3D video frame based on the frame budget and a weighting between the left and right components, the weighting based on a contribution of distortion from the left and right components to a distortion of the 3D video frame;
map the bit allocation values for the bit allocation domain to corresponding quantization parameter (QP) values; and
allocate a number of encoding bits to each of the blocks in the left and right components based on the mapping.

23. The computer program product of claim 22, wherein the plurality of bit allocation domains includes a rho domain.

24. The computer program product of claim 23, wherein the computer-readable, non-transitory medium further comprises code to cause the computer to encode the blocks in the left and right components using the allocated encoding bits.

25. The computer program product of claim 22, wherein the computer-readable, non-transitory medium further comprises code to cause the computer to adjust the weighting based on a type of display device used to view the left and right components.

26. The computer program product of claim 25, wherein the computer-readable, non-transitory medium further comprises code to cause the computer to receive an indication of the type of display device from an output device to which the 3D video frame is transmitted.

27. The computer program product of claim 22, wherein the weighting is based on sensitivity of a human viewer to distortion in the left and right components.

\* \* \* \* \*